United States Patent [19]

Hoenisch

[11] 4,257,237

[45] Mar. 24, 1981

[54] ELECTRICAL CONTROL CIRCUIT FOR ICE MAKING MACHINE

[75] Inventor: Walter H. Hoenisch, Albert Lea, Minn.

[73] Assignee: King-Seeley Thermos Co., Prospect Heights, Ill.

[21] Appl. No.: 39,390

[22] Filed: May 15, 1979

[51] Int. Cl.³ .............................................. F25C 1/00
[52] U.S. Cl. ...................................... 62/157; 62/233; 236/46 R
[58] Field of Search ................. 62/233, 157, 211, 356, 62/66; 425/143; 34/53; 236/46 R

[56] References Cited
U.S. PATENT DOCUMENTS

| 3,714,794 | 2/1973 | Linstromberg et al. | 62/233 X |
| 3,774,407 | 11/1973 | Bright | 62/233 X |

*Primary Examiner*—William E. Wayner
*Attorney, Agent, or Firm*—Harness, Dickey & Pierce

[57] ABSTRACT

A control circuit for an ice making machine having an ice forming mold and a refrigeration system for controlling the operation of the refrigeration system so as to cause water to freeze in the mold during a freezing cycle and to effect release of ice from the mold during a harvest cycle, including a timing circuit that is adapted to vary the time period of the freeze cycle in accordance with the temperatures of the ambient air and/or inlet water and to vary the time period of the harvest cycle in accordance with the temperature of the ambient air. In addition, the control circuit is further adapted to control the operation of the condenser fan during the harvest cycle in accordance with the temperature of the condensing unit.

19 Claims, 1 Drawing Figure

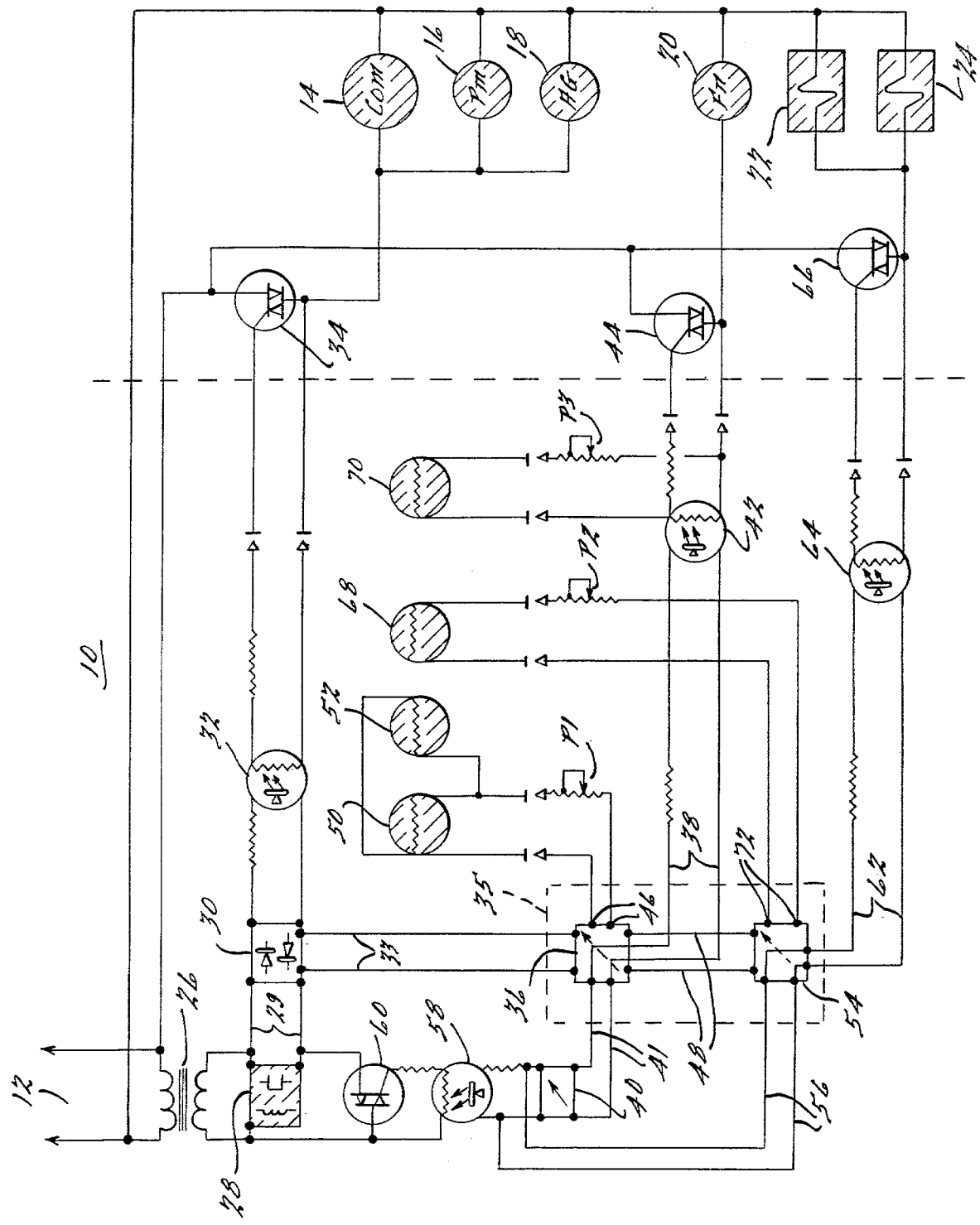

ELECTRICAL CONTROL CIRCUIT FOR ICE MAKING MACHINE

BACKGROUND AND SUMMARY OF THE INVENTION

The present invention relates generally to a control system for a refrigeration apparatus and in particular to an improved control circuit for automatically controlling the operation of an ice making machine in a refrigeration apparatus.

Ice making machines for refrigeration apparatus typically operate in the following manner. When a control in the storage bin calls for more ice cubes, the condensing unit is activated which turns on the compressor to cool the ice cube cups or forms. The pump and agitator motor (if one is used) are also activated to spray water into the cups while the spray is agitated back and forth over the cups to promote the production of clear ice. This step in the process is referred to as the "freeze" cycle.

When the cups become filled with ice, the machine goes into a defrost cycle or what is commonly referred to as the "harvest" cycle. During this cycle, hot water and/or hot gas from the condensing unit are directed around the ice cups, which causes the ice cubes to fall out of the cups into the storage bin. The process continues until the control in the storage bin indicates that the storage bin is full. A more detailed description of the operation of an ice making machine of the type generally described herein is contained in U.S. Pat. No. 3,791,163, issued Feb. 12, 1974, and assigned to the assignee of the present invention.

It is the primary object of the present invention to provide an improved control circuit for an ice making machine of the above described type which is capable of accurately and reliably controlling the size of the ice cubes produced, thereby optimizing the cycle times, reducing the number of cycles required to fill the bin and thus reducing the overall operating time of the machine. In particular, the control circuit according to the present invention is fully automatic and utilizes a timing circuit to control both the freeze and harvest cycles. Moreover, the timing circuit is in turn controlled by the temperatures of the ambient air and the inlet water so that the time periods of the freeze and harvest cycles are varied accordingly. In this manner, the uniformity in the size of the ice cubes produced can be accurately controlled without the need for the more expensive and complicated cube size control apparatus.

Generally, the present control circuit includes two sequentially connected timers, one for controlling the freeze cycle and the other for controlling the harvest cycle. Each timer has a variable time period which is varied in accordance with the resistance values of one or more temperature responsive resistance devices adapted to respond to the temperatures of the ambient air and the inlet water. Thus, when either the temperature of the ambient air or the inlet water changes, the cycle times of the freeze and harvest cycles are adjusted accordingly. In addition, the preferred embodiment of the present invention utilizes an additional temperature responsive resistance device to control the activation of the condenser fan during the harvest cycle so that the refrigerant gas directed around the ice cups is maintained at a high temperature to promote the defrosting or release of the ice cubes from the cups.

Additional objects and advantages of the present invention will become apparent from a reading of the detailed description of the preferred embodiment which makes reference to the drawing which comprises a circuit diagram of a control circuit for an ice making machine according to the present invention.

DETAILED DESCRIPTION OF THE PREFERRED EMBODIMENT

Referring to the drawing, a control circuit 10 according to the present invention is shown. The control circuit 10 is connected to a high voltage supply 12 which is required to operate the various high voltage components of the system designated by shading. The line voltage is reduced to 24 volts by the step-down transformer 26. The 24 volts on the secondary of the transformer 26 are provided to a capacitance bin level control circuit 28. The capacitance bin level control circuit 28 is adapted to control the activation of the remainder of the control circuit 10 by providing a signal at its output on lines 29 whenever the level of ice in the bin is below a first predetermined level. In addition, the capacitance bin level control circuit 28 is further adapted to de-energize the remainder of the control circuit 10 by removing the signal on lines 29 when the level of ice in the bin exceeds a second greater predetermined level. A capacitance bin level control circuit of the type described is disclosed in U.S. Pat. No. 3,360,951, assigned to the assignee of the present invention, which description is incorporated herein by reference.

The output signal on lines 29 from the capacitance bin level control circuit is provided to a rectifier circuit 30 which converts the 24 volts a.c. to a 5 volts d.c. signal. The 5 volts d.c. output signal from rectifier 30 is provided on lines 31 to the gate of a TRIAC 34 through an LED photoconductor isolator 32. LED isolators are utilized throughout the present control circuit 10 in conjunction with each of the solid-state switching devices (TRIACs and SCRs) to isolate the high voltage conducted through these devices from the low voltage section of the circuit. Photoconductor isolators are well known in the art and therefore will not be described in detail. The TRIAC 34 is connected to control the activation of the compressor 14, the pump 16 and the agitator or spray bar motor 18. Optionally, it may be desired to include an additional manually operable switch (not shown) connected in series with just the compressor 14 so that when water is pumped through the machine for cleaning purposes, the compressor 14 can be shut off so that the water does not freeze.

The 5 volts d.c. output signal from rectifier 30 is also provided on output lines 33 to the main timer circuit 35. Timer circuit 35 comprises a pair of timers 36 and 54. Timer 36 has its timing output provided on lines 38 through photoconductor isolator 42 to the gate of TRIAC 44 which controls the activation of the condenser fan 20. In addition, the timing output of timer 36 is also provided on lines 41 to the input of another timer 40. The timed-out output of timer 40 is provided through another photoconductor isolator 58 to the gate of an SCR 60 which is connected across the capacitance bin level control circuit 28.

The timed-out output of timer 36 on lines 48 is provided to the input of the second timer 54 in the main timer circuit 35. The timing output of timer 54 is provided through photoconductor isolator 64 to the gate of TRIAC 66 which controls the energization of the water and gas solenoids, 22 and 24 respectively. In addition, the timing output of timer 54 is also provided on lines 56 through photoconductor isolator 58 to the gate of SCR 60.

Each of the three timers 36, 40 and 54 utilized in the present control circuit 10 are astable sequence timers and operate in the same manner. In general, a signal is provided at the timing output of a timer while the timer is running. Once the timer has timed out, the signal at the timing output is removed and a signal is provided at the timed-out output of the timer, which signal remains for as long as there remains a signal at its input. Timers 36 and 54 in the main timer circuit 35 are variable timers while timer 40 is a fixed timer. In the preferred embodiment herein, timer 36 is selected to have a time period that varies up to thirty minutes. Timer 54 is preferably selected to have a time period that varies up to five minutes. Timer 40 has a fixed time period of one minute.

The time periods of variable timers 36 and 54 are established in accordance with the voltage drops produced across the control terminals, 46 and 72 respectively. The amount of voltage drop is in turn determined by the resistance values of thermistors 50, 52 and 68. Thermistors 50, 52 and 68, as well as thermistor 70, are temperature responsive variable resistance devices whose internal resistance varies directly according to temperature. Thermistors 50 and 52 in the preferred embodiment are positive temperature coefficient (PTC) devices while thermistors 68 and 70 are negative temperature coefficient (NTC) devices. Thermistor 50 is disposed in the water line to indicate inlet water temperature. Thermistors 52 and 68 are located to indicate the ambient air temperature. And thermistor 70 is disposed on the condensing unit to indicate the temperature of the condenser.

Thermistors 50 and 52 are connected in parallel and tied to the control terminals 46 of timer 36 so that the time period of timer 36 is adapted to vary in accordance with variations in the inlet water temperature and the ambient air temperature. Since thermistors 50 and 52 are PTC devices, the time period of timer 36 will increase with increases in either the temperature of the ambient air or the inlet water. Thermistor 68 is connected to the control terminals 72 of timer 54 so that the time period of timer 54 is adapted to vary in accordance with the ambient air temperature. Since thermistor 68 is an NTC device, the time period of timer 54 will decrease with increases in the temperature of the ambient air. Thermistor 70 is connected to the gate of TRIAC 44 which controls activation of the condenser fan 20 and is provided to control the activation of the condenser fan 20 during the harvest cycle as will subsequently be described. Potentiometers P1-P3 are included to provide a means of varying the total resistance in the thermistor circuit lines so that the range of freeze and harvest cycle times can be varied to compensate for different sized condensing units.

The control circuit 10 operates in the following manner. When the capacitance bin level control circuit 28 detects a low ice condition, an output signal is produced on lines 29 which is converted to a d.c. signal by rectifier 30. The converted d.c. signal from rectifier 30 is then provided on lines 31 to energize LED isolator 32 and trigger TRIAC 34, thereby turning on compressor 14, pump 16 and agitator 18. The converted d.c. output signal from rectifier 30 is also provided on lines 33 to the input of the main timer circuit 35 to initiate timer 36 which begins the freeze cycle. With timer 36 running, an output signal is produced on lines 38 which energizes LED isolator 42 and triggers TRIAC 44 to turn on the condenser fan 20. Timer 36 also produces an output signal on lines 41 which is provided to the input of fixed timer 40. In the preferred embodiment, timer 40 is a one minute timer so that after one minute into the freeze cycle, an output signal is produced by timer 40 which energizes LED isolator 58 and triggers SCR 60. With SCR 60 turned on, the capacitance bin level control circuit 28 is effectively bypassed so that the control circuit 10 cannot be de-energized in the middle of the freeze cycle even if the bin level control circuit 28 opens. However, should the bin level control circuit 28 open before one minute of the freeze cycle has elapsed, the control circuit 10 will shut down.

The control circuit 10 will remain in the freeze cycle until timer 36 times out. As previously explained, the time period of timer 36 depends upon the resistance values of thermistors 50 and 52 which in turn vary in accordance with changes in the temperatures of the ambient air and the inlet water, respectively. In the preferred embodiment, the following relationship between average freeze time and temperature has been selected:

| ambient | 38° C. | 30 minutes freeze time |
| water | 38° C. | |
| ambient | 22° C. | 18.5 minutes freeze time |
| water | 10° C. | |
| ambient | 10° C. | 17.5 minutes freeze time |
| water | 5° C. | |

Thus, the freeze cycle time is varied directly in accordance with changes in the temperatures of the ambient air and inlet water which, of course, directly effect the growth rate of the ice cubes being produced.

When timer 36 has timed out, the freeze cycle is terminated and an output signal is provided on lines 48 to the input of timer 54 which initiates the timer 54 and begins the harvest cycle. With timer 54 running, an output signal is produced on lines 62 which energizes LED isolator 64 and triggers TRIAC 66. This in turn energizes the water and gas solenoids 22 and 24 which open to let hot gas and water from the condensing unit flow around the ice cups to cause the ice cubes to fall from the cups. An output signal is also produced by timer 54 during the harvest cycle on lines 56 which energizes LED isolator 58 to maintain SCR 60 in the on condition. In this manner, the control circuit 10 is prevented from being shut down by the capacitance bin level control circuit 28 until the cycle has been completed. This insures that full size ice cubes will be produced at all times.

The control circuit 10 will remain in the harvest cycle until timer 54 times out. As previously noted, time time period of timer 54 depends upon the resistance value of thermistor 68 which in turn varies in accordance with changes in the temperature of the ambient air. In the preferred embodiment, the following relationship has been selected between average harvest time and ambient temperature.

| ambient | 38° C. | 1.75 minutes harvest time |
| ambient | 22° C. | 3.00 minutes harvest time |
| ambient | 10° C. | 3.5 minutes harvest time |

Thus, the harvest cycle time is varied inversely in accordance with changes in the ambient air temperature which directly effects the defrost time required to free the cubes from the ice cups.

In addition, it will be noted that upon completion of the freeze cycle and initiation of the harvest cycle, LED isolator 42 is de-energized by timer 36 thereby turning off TRIAC 44. This in turn de-activates the condenser fan 20 so that during the harvest cycle, the fan 20 is only operated periodically in accordance with the temperature of the condenser which controls the resistance value of thermistor 70. In particular, thermistor 70 acts as a high pressure control by triggering TRIAC 44 whenever the temperature of the condenser, which is directly related to pressure, exceeds a predetermined level. In this manner, the refrigerant gas is maintained at high temperature levels during the harvest cycle to facilitate defrosting or releasing of the ice cubes from the cups.

When timer 54 has timed out terminating the harvest cycle, the signal on lines 58 energizing the LED isolator 58 is removed, thereby turning off SCR 60. At this point, therefore, if the level of ice in the bin is now above the full level, the capacitance bin level control circuit 28 will discontinue production of the output signal to the rectifier 30 on lines 29 and disable the entire control circuit 10. However, if the ice level in the bin is still below capacity, the control circuit 10 will recycle in the manner described until the storage bin is full.

While the above description constitutes the preferred embodiment of the present invention, it will be appreciated that the invention is susceptible to modification, variation and change without departing from the proper scope or fair meaning of the accompanying claims.

What is claimed is:

1. In an ice making machine having an ice forming mold for receiving water to be frozen therein, a refrigeration system, and a control circuit for controlling the operation of said refrigeration system so as to cause water to freeze in said forms during a freezing cycle and to effect release of ice from said forms during a harvest cycle; the improvement wherein said control circuit comprises:
    first temperature responsive means having an electrical characteristic that varies according to temperature and being disposed so as to indicate ambient temperature; and
    timing circuit means responsive to said first temperature responsive means for controlling the time period of said freeze cycle by varying said time period in accordance with variations in said electrical characteristic of said first temperature responsive means.

2. The control circuit of claim 1 wherein said timing circuit means is further adapted to control the time period of said harvest cycle by varying said time period in accordance with variations in said electrical characteristic of said first temperature responsive means.

3. The control circuit of claim 2 wherein said timing circuit means includes a first variable timer for controlling the time period of said freeze cycle and a second variable timer for controlling the time period of said harvest cycle.

4. The control circuit of claim 1 wherein said refrigeration system includes a condensing unit and a condenser fan, and wherein said control circuit further comprises temperature responsive means having an electrical characteristic that varies according to temperature and being disposed so as to indicate the temperature of said condenser, and first switching circuit means for controlling the activation of said fan during said harvest cycle in accordance with variations in said electrical characteristic of said temperature responsive means.

5. The control circuit of claim 3 wherein said first variable timer is adapted to initiate said second variable timer after said first variable timer has timed out.

6. The control circuit of claim 5 wherein said first temperature responsive means comprises first and second temperature responsive resistance elements that are adapted to vary their resistance values in accordance with changes in the temperature of the ambient air.

7. The control circuit of claim 1 which includes second temperature response means having an electrical characteristic that varies according to inlet water temperature and wherein said first timing circuit means is responsive to said first and second temperature responsive means for controlling the time period of said freeze cycle.

8. The control circuit of claim 7 wherein said second temperature responsive means comprises a third temperature responsive resistance element that is adapted to vary its resistance value in accordance with changes in the temperature of the inlet water.

9. The control circuit of claim 8 wherein said first and third temperature responsive resistance elements are connected in parallel and connected to said first variable timer to vary the time period of said timer in accordance with changes in the resistance values of said first and third elements.

10. The control circuit of claim 7 wherein said second temperature responsive resistance element is connected to said second variable timer to vary the time period of said second timer in accordance with changes in the resistance value of said second element.

11. The control circuit of claim 1 further including a storage bin and bin level control means for enabling said timing circuit means when the level of ice in said storage bin falls below a first predetermined level and for disabling said timing circuit means when the level of ice in said storage bin exceeds a second greater predetermined level.

12. The control circuit of claim 11 further including circuit means responsive to said timing circuit means for preventing said bin level control means from disabling said timing circuit means during said freeze cycle and said harvest cycle.

13. The control circuit of claim 12 wherein said circuit means includes a fixed timer which delays operation of said circuit means for a preselected period after the beginning of said freeze cycle.

14. In an ice making machine having an ice forming mold for receiving water to be frozen therein, a refrigeration system, and a control circuit for controlling the operation of said refrigeration system so as to cause water to freeze in said forms during a freezing cycle and to effect release of ice from said forms during a harvest cycle; the method of producing ice including the steps of:
    monitoring the temperature of the ambient air; and
    controlling the time period of said freeze cycle in accordance with variations in the temperature of the ambient air.

15. The control circuit of claim 14 further including the steps of controlling the time period of said harvest cycle in accordance with variations in the temperature of the ambient air.

16. The control circuit of claim 15 wherein the refrigeration system includes a condensing unit and a condenser fan and further including the steps of monitoring the temperature of said condenser and controlling the activation of said fan in accordance with the temperature of said condenser during said harvest cycle.

17. The method as set forth in claim 14 which includes the additional steps of monitoring the temperature of the inlet water, and controlling the time period of said freeze cycle in accordance with variations in the temperature of the ambient air and inlet water.

18. In an ice making machine having an ice forming mold for receiving water to be frozen therein, a refrigeration system, and a control circuit for controlling the operation of said refrigeration system so as to cause water to freeze in said forms during a freezing cycle and to effect release of ice from said forms during a harvest cycle; the improvement wherein said control circuit comprises:

first temperature responsive means having an electrical characteristic that varies according to temperature and being disposed so as to indicate inlet water temperature; and timing circuit means responsive to said first responsive means for controlling the time period of said freeze cycle by varying said time period in accordance with variations in said electrical characteristic of said first temperature responsive means.

19. In an ice making machine having an ice forming mold for receiving water to be frozen therein, a refrigeration system, and a control circuit for controlling the operation of said refrigeration system so as to cause water to freeze in said forms during a freezing cycle and to effect release of ice from said forms during a harvest cycle; the method of producing ice including the steps of:

monitoring the temperature of the inlet water; and
controlling the time period of said freeze cycle in accordance with variations in the temperature of the inlet water.

* * * * *

UNITED STATES PATENT AND TRADEMARK OFFICE
CERTIFICATE OF CORRECTION

PATENT NO. : 4,257,237
DATED : March 24, 1981
INVENTOR(S) : Walter H. Hoenisch

It is certified that error appears in the above—identified patent and that said Letters Patent is hereby corrected as shown below:

Column 5, line 19, "58" should be --56--.

Column 6, line 32, (Claim 10), "7" should be --9--.

Signed and Sealed this

Twenty-ninth Day of September 1981

[SEAL]

Attest:

Attesting Officer

GERALD J. MOSSINGHOFF

Commissioner of Patents and Trademarks